Patented Jan. 20, 1942

2,270,837

UNITED STATES PATENT OFFICE 2,270,837

PROCESS FOR RECLAIMING SPENT CLEANING FLUID

Colin C. Jones, Inglewood, Calif., assignor to Chemical Reclaiming Sales Co., Inc., Los Angeles, Calif.

No Drawing. Application January 20, 1940, Serial No. 314,884

4 Claims. (Cl. 252—331)

This invention relates to processes for breaking emulsions and is especially concerned with a novel process for reclaiming spent commercial cleaning fluid.

Cleaning fluids now commonly in use comprise an organic solvent and water or an aqueous solution dispersed one within the other by means of an emulsifying agent such as soap or the like. In use oleaginous materials, dirt particles and the like accumulate in one of the phases of the emulsion and are retained in suspension by the emulsifying agent. Excessive accumulations of foreign matter in cleaning fluids eventually settle in the cleaning tank and may be removed by decantation in a conventional manner. However, an industrial want has long been felt for means of breaking the emulsions to cause separation of the solvent from the suspended impurities. This has been desirable in the instance of a spent fluid because of the non-settling qualities of the impurities precluding removal by other means and it has been desirable in the instance of muck in that relatively large quantities of solvent frequently are retained in the muck and hence discarded.

It has been suggested that an acid or similar polar substance be employed to facilitate breaking of the emulsion in the reclamation of spent cleaning fluid, but this means has been disadvantageous in that quantities of acid, however small, are retained in the solvent and when the reclaimed solvent is reused, deleteriously affect dyed fabrics cleaned therewith. Basic substances have proven unsatisfactory in the breaking of the mentioned type of emulsions in that the emulsifying agents commonly used frequently are basic themselves and hence show relatively great tolerance to lowering of the hydrogen ion concentration of the material.

It is an object of the present invention to provide a novel process for reclaiming solvent from spent cleaning fluid whereby the fluid when mixed with an innocuous organic substance separates from suspended impurities and the aqueous solution with which it is emulsified yielding a clear liquid suited for reuse.

Another object of this invention is to provide a novel process for the treatment of spent cleaning fluid of the emulsion type whereby separation of the emulsion phases can be effectuated under ordinary pressure and at moderate temperatures without requiring the use of special equipment on skilled labor.

A still further object of this invention is to provide a process for reclaiming organic solvent from spent cleaning fluid by treatment with an organic material in a manner such that the solvent after treatment is substantially free from the material and the material can be easily separated from the segregated impurities removed from the solvent.

It is an advantage of the novel reclamation process for treating spent cleaning fluid according to the present invention that both emulsified oleaginous materials and suspended particles of dirt are removed from the solvent and are segregated from the emulsion breaking material in a manner such that recovery of the last mentioned substance is facilitated.

Another advantage of this process of solvent recovery from spent cleaning emulsion over other methods, particularly the acid treatment method mentioned above, is that substances deleteriously affecting materials commonly cleaned with the fluid are not present in the recovered solvent as a result of the treatment.

A feature of the novel reclamation process according to the present invention is that the spent fluid is treated with a gaseous emulsion breaking substance which, being absorbed by the fluid, causes separation of the mixture into a plurality of relatively miscible layers of liquid which can be easily separated by decantation or the like.

Other objects, advantages and features of the novel process for reclaiming spent cleaning fluid according to this invention will be apparent to those skilled in this art as the following description proceeds.

Regarded in certain of its broader aspects the novel process for reclaiming solvent from spent cleaning fluid according to this invention comprises treating the spent fluid with isopropanol.

In order to facilitate a fuller and more complete understanding of the matter of the present invention and especially of its preferred practice, a specific embodiment thereof will be hereinafter described, but it is clearly to be understood that the present invention is not limited to this embodiment but is to be construed as to the breadth of scope by reading the subjoined claims in the light of the entire specification with due regard to the equivalence and variations which would suggest themselves to those skilled in this art.

As a specific example of the practice of this invention, its application to the reclamation of spent commercial petroleum naphtha of the type sold to the trade as Stoddard solvent will be described, it being understood that identical treatment could be applied with equal advantage to other types of commercial cleaning fluids. The spent fluid containing impurities retained in suspension by the emulsifying agent, heated to a temperature of the order of 65° C., is washed with vaporized isopropanol, preferably by discharge of the vapor through submersed jets whereby fine streams of bubbles of the vapor ascend through and are absorbed by the fluid under ordinary conditions of temperature and pressure. Isopropanol boils at about 82° C. Hence it is desirable that the temperature of the vapor exceed this value. Experience indicates that for satisfactory treatment approximately one percent by volume of isopropanol based upon fluid being treated should be used, but in some instances the proportion may be increased to two percent particularly if liquid instead of vaporized isopropanol is used. The time of treatment under the indicated conditions is about an hour, but this period may be increased or diminished by diminishing or increasing respectively the temperature at which the treatment takes place, or by altering the proportion of isopropanol used, to which the time of treatment is inversely proportional and furthermore a longer time is required for equivalent effect with liquid isopropanol than when vaporized isopropanol is used. In some instances the temperature of treatment may desirably be increased to about 90° C. but the optimum temperature can be easily determined by those skilled in this art after test runs with the specific materials being treated. The temperature of treatment is also to a measure dependent upon the amount of oleaginous impurities present being directly proportional thereto, but experience indicates that temperatures above 110° C. are undesirable from the standpoint of this invention.

The spent solvent, prior to treatment, is a viscous dark gray colored fluid essentially apparently homogeneous and having a definitely alkaline reaction. As the isopropanol and water are introduced into the fluid, separation into layers commences, the relatively light solvent rising to the top to form a substantially clear supernatant layer and the alkaline solution localizing itself thereunder. The impurities in most instances form an intermediate layer or are present to a limited degree in the solution layer. The isopropanol being miscible with the solution, collects in this layer and subsequently may be recovered therefrom by fractionation in a manner familiar to those skilled in this art.

When the layer has proceeded to requisite degree, decantation or other methods of physical separation of the layers is employed whereby the top layer of solvent is removed for storage or reuse and the aqueous layer is removed for isopropanol recovery treatment. The separated impurities consisting largely of dirt particles, oleaginous substances and the like are of course discarded.

Other similar substances may be used to replace in whole or part the isopropanol above mentioned in the practice of this invention but the results so attained are not comparable to those attained when isopropanol alone is used. For instance if ethanol or n-propanol are used the separation of solvents from the impurities is clearly incomplete and hence retreatment or auxiliary treatment is necessary. The butanols are unsatisfactory in use since the oleaginous impurities removed by isopropanol in this instance are more soluble in and hence accumulate in the solvent layer instead of separating therefrom as is desired. Moreover the highly objectionable odor of butanol tenaciously adheres to garments and hence traces of butanol retained in the solvent would have to be removed before the solvent advantageously could be reused.

Having thus described the present invention, what it is desired to secure by Letters Patent is:

1. Process of removing suspended impurities from a spent emulsion-type petroleum naphtha cleaning fluid consisting in introducing water and isopropanol vapor at a temperature exceeding the boiling point of isopropanol into the spent petroleum naphtha at a temperature of the order of 65° C., thereby causing separation of the spent petroleum naphtha into a layer of petroleum naphtha and an aqueous layer.

2. Process of separating suspended impurities from a spent emulsion-type petroleum naphtha cleaning fluid consisting of petroleum naphtha and an alkaline solution distributed one within the other by an emulsifying agent such as soap which comprises passing isopropanol vapor into the heated impure petroleum naphtha cleaning fluid causing separation of a supernatant layer of petroleum naphtha and subjacent layers of solution impurities and isopropanol.

3. The process of separating suspended impurities from petroleum naphtha cleaning fluid, consisting in introducing water and isopropanol vapor at a temperature exceeding the boiling point of isopropanol into the spent petroleum naphtha causing the separation of the same into a top layer of petroleum naphtha and a lower aqueous layer and decantering the top layer therefrom.

4. The process of separating suspended impurities from petroleum naphtha, consisting in introducing water and isopropanol vapor at a temperature exceeding the boiling point of isopropanol upwardly through the spent petroleum naphtha causing the separation of the same into a top layer of petroleum naphtha and a lower aqueous layer, and decantering the top layer therefrom.

COLIN C. JONES.